(12) United States Patent
Waggoner et al.

(10) Patent No.: US 10,880,585 B1
(45) Date of Patent: Dec. 29, 2020

(54) SPLIT-AND-STITCH MEDIA CONTENT ENCODING

(71) Applicant: Amazon Technologies, Inc., Seattle, WA (US)

(72) Inventors: Charles Benjamin Franklin Waggoner, Portland, OR (US); Sitaraman Ganapathy, Issaquah, WA (US); Deepthi Nandakumar, Bengaluru (IN); Srikanth Kiran Kotagiri, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/439,093

(22) Filed: Jun. 12, 2019

(51) Int. Cl.
*H04N 21/234* (2011.01)
*H04N 19/184* (2014.01)
*H04N 19/64* (2014.01)
*H04N 19/152* (2014.01)
*H04N 19/114* (2014.01)
*H04N 19/172* (2014.01)
*H04N 21/44* (2011.01)

(52) U.S. Cl.
CPC ..... *H04N 21/23424* (2013.01); *H04N 19/114* (2014.11); *H04N 19/152* (2014.11); *H04N 19/184* (2014.11); *H04N 19/64* (2014.11); *H04N 21/234* (2013.01); *H04N 21/23406* (2013.01); *H04N 19/172* (2014.11); *H04N 21/44* (2013.01); *H04N 21/44016* (2013.01)

(58) Field of Classification Search
CPC ............ H04N 21/23406; H04N 21/234
See application file for complete search history.

(56) References Cited

U.S. PATENT DOCUMENTS

| | | | |
|---|---|---|---|
| 6,587,506 B1* | 7/2003 | Noridomi | H04N 21/23406 348/705 |
| 2004/0255328 A1* | 12/2004 | Baldwin | H04N 21/2662 725/90 |
| 2005/0190781 A1* | 9/2005 | Green | H04N 21/4263 370/432 |
| 2007/0071398 A1* | 3/2007 | Raveendran | H04N 19/194 386/326 |
| 2007/0153914 A1* | 7/2007 | Hannuksela | H04N 21/4384 375/240.26 |
| 2008/0115176 A1* | 5/2008 | Rodriguez | H04N 21/440281 725/89 |
| 2009/0310669 A1* | 12/2009 | Konoshima | H04N 19/436 375/240.01 |
| 2010/0142917 A1* | 6/2010 | Isaji | H04N 21/234381 386/343 |
| 2010/0146145 A1* | 6/2010 | Tippin | H04N 21/23439 709/236 |
| 2011/0134994 A1* | 6/2011 | Lu | H04N 21/6437 375/240.02 |
| 2012/0084826 A1* | 4/2012 | Xu | H04N 21/6581 725/109 |

(Continued)

*Primary Examiner* — David N Werner
(74) *Attorney, Agent, or Firm* — Weaver Austin Villeneuve & Sampson LLP

(57) ABSTRACT

Techniques enabled by the present disclosure enable media content to be split into sections that can be encoded by multiple video encoders. The disclosed techniques further enable the separately encoded sections to be stitched back together using coordination logic that does not require bi-directional communication between encoding processes.

20 Claims, 6 Drawing Sheets

(56) References Cited

U.S. PATENT DOCUMENTS

| | | | |
|---|---|---|---|
| 2012/0144437 A1* | 6/2012 | Beals | H04N 21/8456 725/92 |
| 2012/0272286 A1* | 10/2012 | Pasternak | H04N 21/23608 725/146 |
| 2013/0089156 A1* | 4/2013 | Gautier | H04N 21/4384 375/240.25 |
| 2013/0091251 A1* | 4/2013 | Walker | H04N 21/23424 709/219 |
| 2014/0294096 A1* | 10/2014 | Togo | H04L 65/4084 375/240.26 |
| 2017/0213575 A1* | 7/2017 | Saloman | H04N 21/23424 |
| 2017/0264866 A1* | 9/2017 | Li | H04N 21/234 |
| 2018/0146221 A1* | 5/2018 | Bright-Thomas | H04N 19/51 |

* cited by examiner

SPLIT-AND-STITCH MEDIA CONTENT ENCODING

BACKGROUND

Split-and-stitch media content encoding divides media content into smaller sections that can each be encoded on separate processing cores and/or threads on one or more computing devices. While media content encoding time can be improved by taking advantage of parallel processing of the sections of the media content, naïve split-and-stitch encoding can involve a quality loss or playback function at the stitch points between the sections.

One type of quality loss is due to discontinuities in state information between the end of a section and the beginning of a subsequent section. For example, because different sections of the media content are encoded by different encoders, state information for a first encoder modeling video decoder buffer usage at the end of a first section may be unknown to a second encoder encoding a second section. Underutilization of buffer space by the second encoder can negatively affect the customer experience. For instance, if the second encoder assumes that the buffer usage at the end of the first section is higher than actual buffer usage, a complex scene in the second section might be allocated insufficient bits, which in turn degrades perceptual video quality. Overutilization of buffer space by the second encoder can also degrade the customer experience. For instance, if the decoder has insufficient buffer space to store received bits, video playback may be paused to wait for sufficient bits to be removed from the decoder buffer, or worse yet, the video decoding system may malfunction. Such underutilization or overutilization may be the result of "tapering" algorithms that varies buffer usage restrictions at different points within a section.

Conventional split-and-stitch encoding processes address the drawbacks of these tapering algorithms by relying on complex coordination logic, such as, for example, bidirectional communication between a control layer and the individual encoder processes, and by relying on re-encoding content adjacent to the stitch points to reduce the amount of discontinuity in the state information. In some cases, such complex coordination logic and associated latency raises the cost of deployment, or requires certain modifications to existing encoders, or is incompatible with certain types of media content (e.g., low latency broadcast of live media content).

DETAILED DESCRIPTION

Figure 1A:
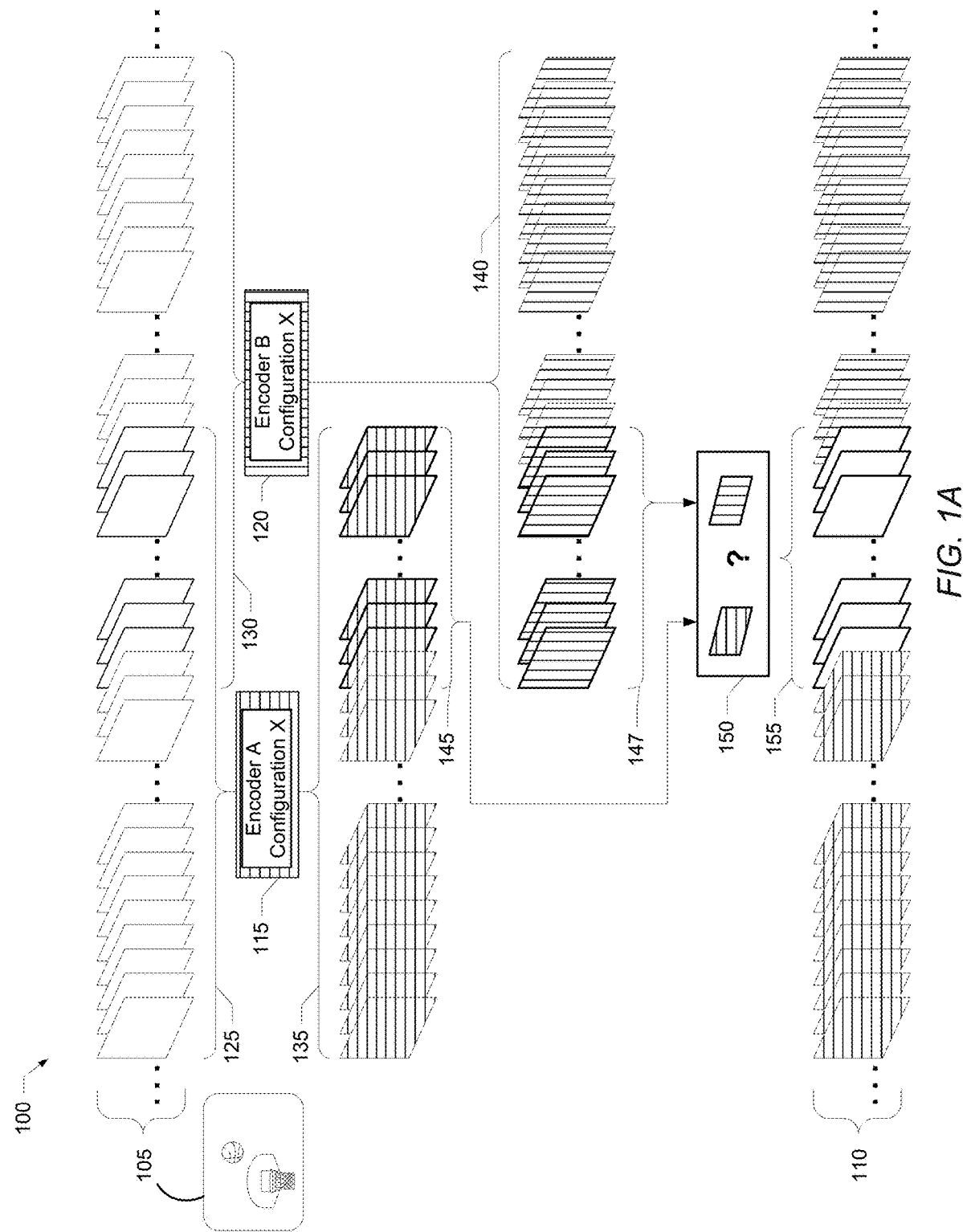
FIGS. 1A-D illustrate an example of a system for split-and-stitch encoding of media content.

Techniques enabled by the present disclosure enable media content to be split into sections that can be encoded by multiple video encoders. The disclosed techniques further enable the separately encoded sections to be stitched back together using coordination logic that does not require bi-directional communication between encoding processes. In various implementations, the disclosed techniques improve the technology of media content encoding and have the practical application of reducing media content encoding time, such as, for example, by allowing parallelized media content encoding.

In some implementations of the disclosed techniques for split-and-stitch encoding of media content, each encoded section overlaps with the previous and/or next encoded section. For example, in contrast to encoder A encoding a first section with frames 1-1000 of the media content and encoder B encoding a second section with frames 1001-2000 of the media content, encoder A encodes a first section with at least frames 1-1100, and encoder B encodes a second section with at least frames 900-2000. Thus, frames 900-1100 of the media content are encoded at least twice (e.g., as part of encoding the first section by encoder A, and again as part of encoding the second section by encoder B). When stitching the output of different encoders together, one of the two choices for the encoded frames 900-1100 is selected based on one or more criteria.

One example of a criterion for selecting between the multiple choices for the encoded frames 900-1100 is based on maximizing buffer usage while preventing buffer overflow. In another example, a criterion is based on aligning a frame corresponding to a scene change with a frame encoded as a particular type of frame (e.g., an instantaneous decoder refresh (IDR) frame that causes the contents of a reference buffer to change status, etc.). In yet another example, a criterion is based on minimizing discontinuities in perceptual image quality (e.g., smoothing out the fluctuations in one or more quality metrics, such as, for example, the Video Multimethod Assessment Fusion (VMAF) quality metric). In still another example, a criterion is based on avoiding discontinuities in temporal coherence (e.g., changes in motion, image style, image content such as natural or synthetic imagery, etc.).

Continuing the previous example, encoder A encodes a first section with at least frames 1-1100, and encoder B encodes a second section with at least frames 900-2000, the results of stitching the encoded first section and the encoded second section includes a contiguous sequence of frames beginning with part of the non-overlapping portion (e.g., frames 1-899) of the encoded first section, followed by either the overlapping portion (e.g., frames 900-1100) from the encoded first section or the encoded second section, followed by part of the non-overlapping portion (e.g., frames 1101-2000) of the encoded second section.

In some implementations, encoder B can begin encoding the second section before encoder A finishes encoding the first section, which can reduce the overall encoding time, or can provide compatibility with ongoing live video being uploaded or created. In particular implementations, the encoded first section and the encoded second section can be performed without communication either directly (e.g., peer to peer) or indirectly (e.g., through centralized logic) between encoder A and encoder B. In various implementations, encoder A and encoder B are respectively encoders that perform non-split-and-stitch encoding, but can be integrated into the disclosed techniques for split-and-stitch without modifications to encoder A or encoder B. In a class of implementations, the coordination logic to perform the disclosed techniques for split-and-stitch is limited to specifying the range of frames of the media content that encoder A and encoder B receives, and then controlling multiplexing of the encoded outputs of encoder A and encoder B based on compliance with one or more criteria (e.g., buffer usage, IDR placement, perceptual image quality, temporal coherence, etc.). An example will be instructive.

FIG. 1A depicts a media content encoding system 100 capable of performing split-and-stitch media content encoding without requiring direct or indirect bi-directional communication between encoder 115 and encoder 120. Media content 105 represents media content to be encoded by media content encoding system 100. In FIG. 1A, media content 105 is illustrated as a group of image frames representing a live broadcast of an ongoing sporting event, with time elapsing from left to right. Media content encoding system 100 includes encoder 115 and encoder 120, each of which can perform media content encoding in parallel, such as concurrently or overlapped in time. As depicted in FIG. 1A, encoder 115 and encoder 120 are configured to use the same encoding parameters (e.g., "Configuration X"). For example, for an implementation using MPEG H.264, encoder 115 and encoder 120 are each configured to the same profile and level such that encoding parameters for each encoder are identical (e.g., identical settings for resolution, frame rate, peak/average bit rate, max\min quantization parameter values, etc.). It should be appreciated that media content encoding system 100 can include an arbitrary number of encoders n, where n≥2 and where each of the encoders are configured to use the same or different set of encoding parameters.

Media content encoding system 100 includes logic (discussed in further detail later in relation to FIG. 2) for associating portions of media content 105 with a particular encoder. In FIG. 1A, portion 125 of media content 105 is associated with encoder 115. As illustrated, portion 125 corresponds to a contiguous sequence of image frames (e.g., a temporal portion of a basketball game). Portion 130 of media content 105 is associated with encoder 120. As illustrated, portion 130 corresponds to another contiguous sequence of image frames, and portion 125 and portion 130 include image frames that are the same image frames from media content 105 (e.g., the same bits in a bitstream representing media content 105). Specifically, both portion 125 and portion 130 include the image frames from media content 105 that are highlighted with a bold outline in FIG. 1A. In other words, certain image frames from media content 105 are being assigned for encoding by both encoder 115 and encoder 120, and are therefore being encoded twice using identical encoding parameters (e.g., the same profile and level in H.264). In FIG. 1A, encoded image frames 145 (which are part of the encoded image frames 135 output by encoder 115) and encoded image frames 147 (encoded image frames 140 output by encoder 120) represent the duplicate (also referred to as redundant) encodings of the same image frames from media content 105.

For illustrative purposes, encoder 115, also referred to as Encoder A, and encoded image frames 135 output by encoder 115 are visually represented by the fill pattern with horizontal lines. Encoder 120, also referred to as Encoder B, and encoded image frames 140 output by encoder 120 are visually represented by the fill pattern with vertical lines.

In FIG. 1A, Encoder A encodes portion 125 with, for example, at least frames 1-1100 of media content 105, and encoder B encodes portion 130 with, for example, at least frames 900-2000. There is an overlap (also referred to herein as the "lapped" interval of frames) in frames 900-1100 between portion 125 (also referred to herein as a "section") encoded by encoder A and portion 130 encoded by encoder B. Because of this overlap, when multiplexing (also referred to herein as "muxing," or "stitching") the encoded image frames 135 output by encoder A and the encoded image frames 140 output by encoder B into encoded representation 110 (e.g., a particular representation available for playback as indicated in a manifest file under the MPEG-DASH video encoding standard, such as at a 1080P resolution, 30 frames per second, max bandwidth 1000 kbps, etc.), muxing logic 150 has multiple choices in the frame 900-1100 range. Specifically, muxing logic 150 can include either encoded image frames 145 or encoded image frames 147 for the overlapping portion 155 in encoded representation 110.

When stitching encoded image frames 135 output by encoder A and encoded image frames 140 output by encoder B, one or more criteria are used to select which of the multiple choices in the frame 900-1100 range to include in the stitched output for encoded representation 110.

For example, a buffer usage criterion can be used. In certain implementations, the buffer usage criterion is based on the video buffering verifier (VBV) or the hypothetical reference decoder (HRD) buffer models in the MPEG or VC-1 video standards, which restricts the quantity of bits stored in a buffer with respect to time. For instance, returning to FIG. 1A, for the encoded image frames 135 output by encoder 115, the buffer usage in the frame 900-1100 range (the end portion of the encoding of portion 125) is 25% of the decoder buffer capacity, and for the encoded image frames 140 output by encoder 120, the buffer usage in the frame 900-1100 range (the beginning portion of the encoding of portion 130) is 75% of the decoder buffer capacity.

Such a variation in buffer usage despite the same frames being encoded (i.e., frame 900-1100) may arise because of the complexity of the other frames in the portion being encoded (e.g., if frames 1-899 of portion 125 are complex and require many bits to encode with sufficient quality, fewer bits are allocated to frames 900-1100 in portion 125, and if frames 1101-2000 of portion 130 are simple and require fewer bits to encode with sufficient quality, more bits are allocated to frames 900-1100 in portion 130).

If the buffer usage for the frame 1-899 range of the encoded image frames 135 is 75% of the decoder buffer capacity, muxing logic will select the encoding of the frame 900-1100 range from the encoded image frames 135 (which consumes 25% of the decoder buffer) rather than select the encoding of the frame 900-1100 range from the encoded image frames 140 (which consumes 75% of the decoder buffer). In this instance, muxing logic 150 selects the encoded image frames 145 that are a subset of the encoded image frames 135, which is associated with a lower buffer usage, rather than the encoded image frames 147 that are a subset of the encoded image frames 140, which is associated with a higher buffer usage, because doing so reduces the risk of a buffer overflow (also referred to herein as a "buffer overrun").

It should be appreciated that in other instances, such as when the frame 1-899 range of the encoded image frames 135 uses a small amount of the decoder buffer, the muxing logic may select for the image frames in overlapping portion 155 a version that is associated with a higher buffer usage, to avoid underutilization of the buffer (i.e., avoid the occurrence of a particular time interval in the media content playback timeline where the buffer has significant unused capacity, which corresponds to the video frames of the particular time interval being encoded with fewer bits than possible based on decoder buffer capacity).

Figure 1B:
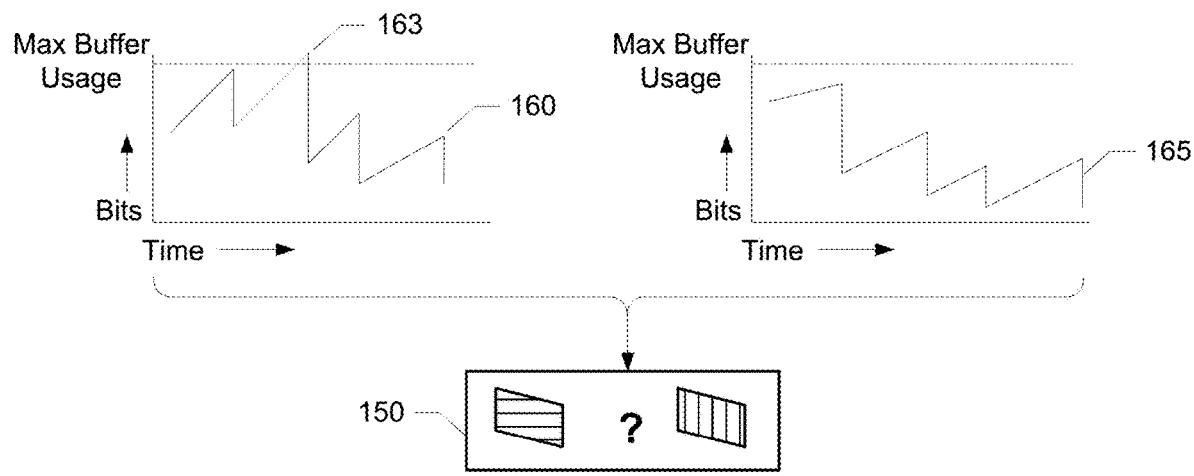

For example, referring to FIG. 1B, a buffer usage trace 160 represents a stitching of a subset of encoded image frames 145 with a subset of encoded image frames 147 based on a particular stitch point that results in violation of a buffer usage criterion, as depicted by the quantity of bits along the y-axis exceeding the horizontal dashed line labeled "Max Buffer Usage" (as represented by buffer overrun 163). In contrast, buffer usage trace 165 represents a stitching of a subset of encoded image frames 145 with a subset of encoded image frames 147 based on a different stitch point that does not result in violation of the buffer usage criterion, as depicted by the quantity of bits along the y-axis remaining below the "Max Buffer Usage" constraint.

Figure 1C:
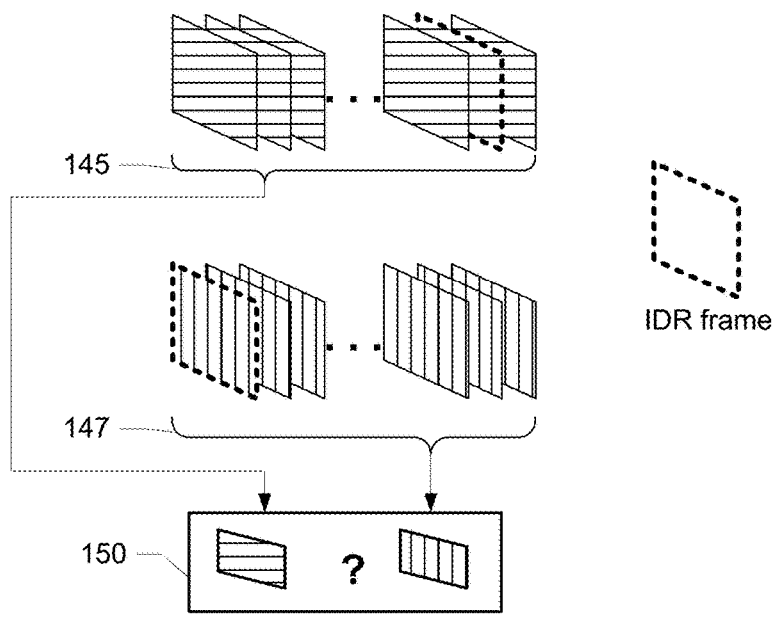

As another example, referring to FIG. 1C, a frame type criterion can be used by muxing logic 150. In certain implementations, the frame type criterion is based on the location of instantaneous decoder refresh (IDR) frames in encoded image frames 145 and encoded image frames 147, as depicted by the frames with a dashed outline in FIG. 1C. Encoder 115 or encoder 120 outputs an IDR coded frame to clear the contents of the reference picture buffer. For example, upon receiving an IDR coded frame, a decoder can mark frames in the reference buffer as being unused for reference based decoding (e.g., macro blocks in later frames are not encoded as differences from macro blocks in frames previously stored in the reference buffer).

In an example implementation using the MPEG H.264 standard, an IDR frame is a type of intra-coded frame (I-frame) that specifies that no frame after the IDR frame can reference any frame before it. In contrast, in the scenario where a non-IDR I-frame is used instead of an IDR frame, a frame after the I-frame can reference a frame before the I-frame. Distortions, such as those arising from variability in the precision of the inverse DCT, can accumulate in the absence of an IDR frame as the chain of dependencies for reference based decoding grows (e.g., a decoded frame which itself has distortions serves as a reference for decoding a second frame, and the decoded second frame with further distortions then serves as a reference for decoding, and so forth). While limiting the number of frames between two successive IDR frames can help reduce certain types of distortions, IDR frames in close proximity can also create other types of distortions. For example, frequent IDR frames can introduce a type of pulsating distortion where the visual quality of an IDR frame is visibly different from that of the surrounding differentially encoded frames.

Media content encoding system 100 can take into consideration the number of frames between successive IDR frames when selecting between the encoded image frames 145 output by encoder 115 or the encoded image frames 147 output by encoder 120 to use for overlapping portion 155. For example, encoder 115 outputs an encoding of frame 895 as an IDR frame, such as, for example, because encoder 115 detected a scene transition at that frame or received an instruction that frame 895 should be encoded as an IDR frame based on a lookahead pass or an indication of a chapter point or ad insertion point. In such a scenario, muxing logic 150 can select for the overlapping portion 155 the encoded image frames 145 output by encoder 115, rather than the encoded image frames 147 output by encoder 120. This prevents an IDR frame being placed at frame 895 and again at frame 900, since the first encoded frame (corresponding to frame 900) in the encoded image frames 147 is the initial IDR frame within the larger grouping of encoded image frames 140. In other words, muxing logic 150 selects a particular version of the overlapping portion 155 based on avoiding having IDR frames being placed five frames apart, minimizing the risk of a pulsing distortion.

As another example, encoder 115 outputs an encoding of frame 200 as an IDR frame, and does not output any more IDR frames for the remainder of the range that ends at frame 1100. Such an instance may arise for a lengthy shot that does not have an obvious transition in the frames 200-1100. The first encoded frame in the encoded image frames 147 is the initial frame within encoded image frames 140 (which begins at frame 900), therefore the encoded image frames 147 include an IDR frame at frame 900. Continuing the example, the next IDR frame in encoded image frames 140 output by encoder 120 is at frame 1500. Muxing logic 150 can select for the frames 900-1100 between the encoded image frames 145, which have no IDR frames in the frames 900-1100, and encoded image frames 147 which includes one IDR frame in the frames 900-1100, namely, at frame 900. Such a scenario where the selection for the overlapping portion 155 is based on including an IDR frame where there previously was no IDR frame can also be referred to as "early GOP termination," as the introduction of an IDR frame serves to close the preceding group-of-pictures (GOP). It should be appreciated that media content encoding system 100 includes logic for verifying frame dependencies for special cases relating to early GOP termination, such as, for example, determining whether a frame prior to the IDR references a frame after the IDR.

Muxing logic 150 can make a selection based on the criterion that because the preceding IDR frame is at frame 200, the choice of frames for overlapping portion 155 should provide the earliest IDR frame. Specifically, by selecting encoded image frames 147 to use for overlapping portion 155, the number of frames between successive IDR frames is 700 (e.g., frame 200 to frame 900), which is lower than the 1300 frames between successive IDR frames if encoded image frames 145 is used (e.g., frame 200 to frame 1500, since the IDR frame at frame 900 is skipped by virtue of forgoing selection of encoded image frames 147). In other words, muxing logic 150 selects a particular version of the overlapping portion 155 based on preferring a separation of 700 frames rather than 1300 frames between two successive IDR frames, minimizing the risk of distortion caused by a chain of reference dependencies.

Figure 1D:
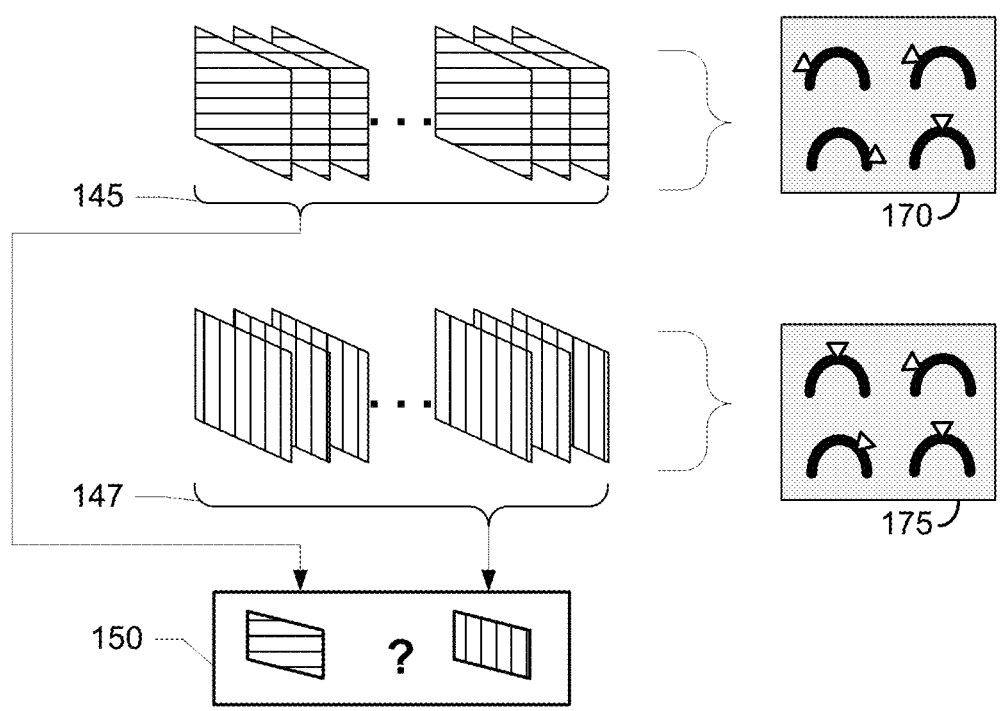

As yet another example, referring to FIG. 1D, one or more interframe comparison metrics can be used. For example, FIG. 1D depicts encoded image frames 145 as having a first set of interframe comparison metrics 170, and encoded image frames 147 as having a second set of interframe comparison metrics 175. In certain implementations, the set of interframe comparison metrics can include one or more perceptual image quality criteria based on psychovisual quality metrics, such as, for example, the video quality metric (VQM), motion-based video integrity evaluation (MOVIE), Sarnoff JND, or the Video Multimethod Assessment Fusion (VMAF).

For example, at frame 895 in encoded image frames 135, a visual quality metric indicates average visual quality. For encoded image frames 145 (which represent frames 900-1100), a visual quality metric continues to indicate average visual quality. In contrast, for encoded image frames 147 (which also represent frames 900-1100), a visual quality metric indicates excellent visual quality. Despite encoded image frames 147 output by encoder 120 providing superior visual quality (in addition to complying with VBV requirements and IDR placement preferences), muxing logic 150 selects encoded image frames 145 for overlapping portion 155. In other words, muxing logic 150 selects a particular version of the overlapping portion 155 based on minimizing dramatic discontinuities in perceptual image quality, even if it means forgoing encoded image frames with superior visual quality (i.e., preferring a sequence of average visual quality followed by a sequence with average visual quality, rather than a sequence of average visual quality followed by a sequence with excellent visual quality).

It should be appreciated that muxing logic 150 can account for any of a wide variety of criteria interframe comparison metrics (e.g., temporal coherency, etc.) when selecting which duplicate encodings of overlapping portion 155 to use for encoded representation 110.

In certain implementations, a portion can have more than one overlapping region. For example, while for clarity purposes FIG. 1 depicted portion 130 associated with encoder 120 having one overlapping region (i.e., a beginning region overlapping with an end region of portion 125 associated with encoder 115), portion 130 can have an end region overlap with a beginning region of a third portion (not depicted), and the third portion can be assigned for encoding by encoder 115 or a third encoder (not depicted). In other words, both the initial and terminal part of a portion being encoded by an encoder can be overlapping with other portions of media content 105 being encoded by one or more other encoders.

In a class of implementations, muxing logic 150 can make a selection for overlapping portion 155 based on simultaneous consideration of multiple criteria (e.g., complying with VBV requirements and managing IDR frame placements, etc.). In particular implementations, muxing logic 150 can prioritize certain criteria over others (e.g., ensuring VBV compliance is prioritized over other criteria, IDR placement is prioritized over temporal coherency, etc.). In various implementations, the use of particular criteria can be dynamic (e.g., for certain ranges in buffer occupancy values, enable/disable certain other criteria), and the prioritization between different criteria can be dynamic (e.g., for certain portions, prioritize IDR placement over temporal coherence, while for other portions, prioritize temporal coherence over IDR placement).

Figure 2:
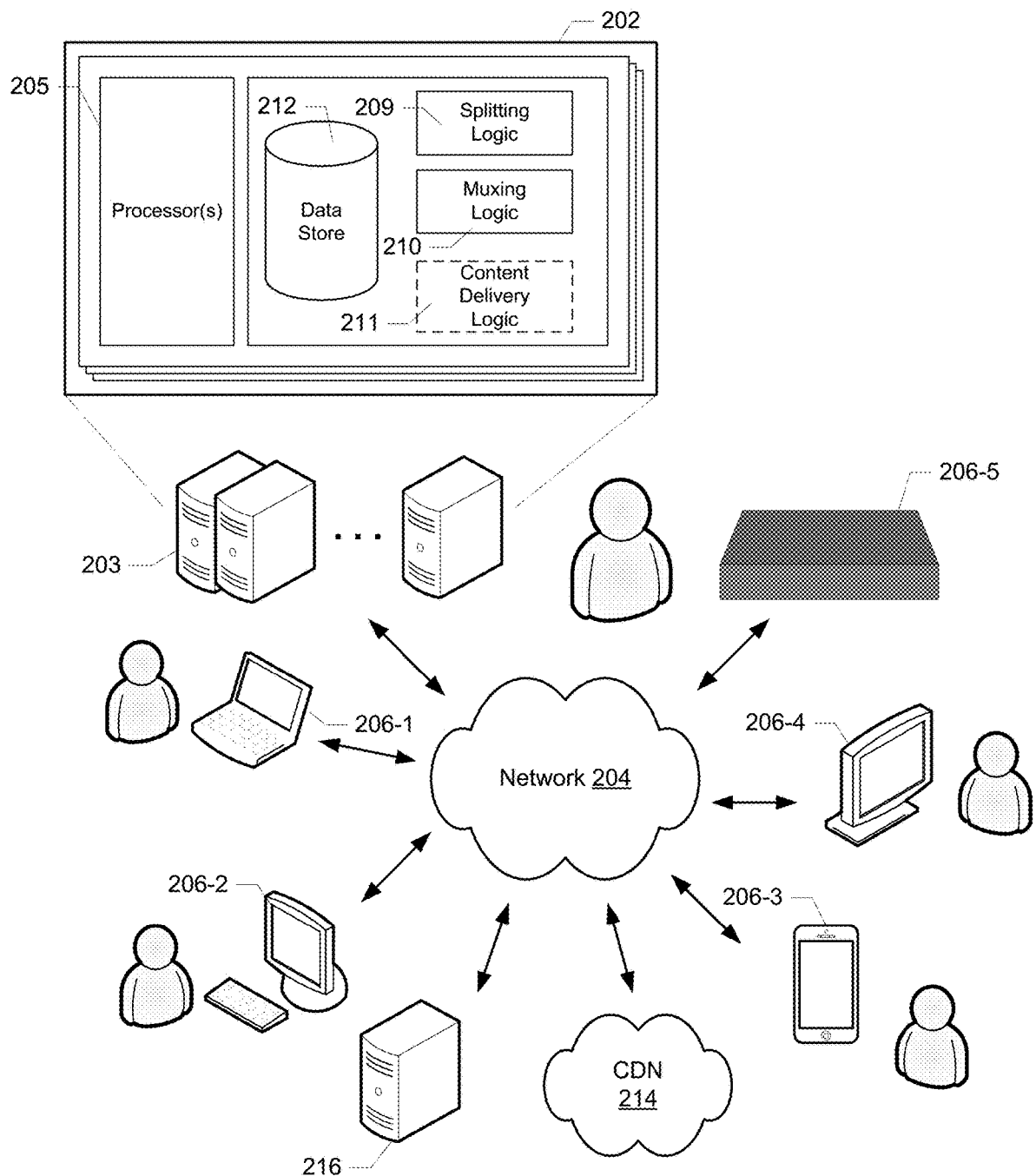
FIG. 2 illustrates an example of a computing environment for split-and-stitch encoding of media content.

FIG. 2 illustrates an example of a computing environment in which video streams may be encoded by media content encoding system 100 and transmitted via network 204 to a variety of viewer devices (206-1 through 206-5) implementing the techniques described herein. Service 202 may conform to any of a wide variety of architectures such as, for example, a services platform deployed at one or more co-locations, each implemented with one or more servers 203 having one or more processors 205 (e.g., central processing units (CPUs), graphic processing units (GPUs), tensor processing units (TPUs), etc.). Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Viewer devices 206 may be any suitable device capable of connecting to network 204 and generating and/or consuming content streams. Such devices may include, for example, mobile devices (e.g., cell phones, smart phones, tablets, and the like), personal computers (e.g., laptops and desktops), set top boxes (e.g., for cable, satellite, and online systems), smart televisions, gaming consoles, wearable computing devices (e.g., smart watches or smart glasses), internet-connected cameras, voice-activated smart home devices (e.g., with integrated personal digital assistants), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling service 202. Alternatively, such resources may be independent of service 202, e.g., on a platform under control of a separate provider of services and/or computing resources with which service 202 connects to consume resources as needed.

It should be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

It should also be noted that implementations are contemplated in which, in addition to splitting logic 209 for specifying the range of frames of media content 105 to associate with different encoders, and muxing logic 210 to determine which encoder output in the overlapping regions to use for encoded representation 110, service 202 may include other types of logic, such as content delivery logic 211, along with other logic (not shown) involved in split-and-stitch media content encoding (e.g., computing cluster operation and management, multi-processing core synchronization, file transfer, etc.) and delivery as part of a video-on-demand service or a live/broadcast video service.

In addition to information for split-and-stitch media content encoding, service 202 may also include a variety of information related to the video content (e.g., other associated metadata and manifests in data store 212 which service 202 uses, or to which service 202 provides access or transmits to viewer devices 206). For example, data store 212 may also include data representing encoder configurations, computing cluster capabilities, parallel processing policies, etc. In some cases, any of the information in data store 212 may be provided and/or hosted by one or more separate platforms, e.g., CDN 214 or other third-party platform. It should be noted that, while logic 209, 210, and 211, and data store 212 are shown as integrated with service 202, implementations are contemplated in which some or all of these operate remotely from the associated service, and/or are under the control of an independent entity. Those of skill in the art will understand the diversity of use cases to which the techniques described herein are applicable.

Figure 3:
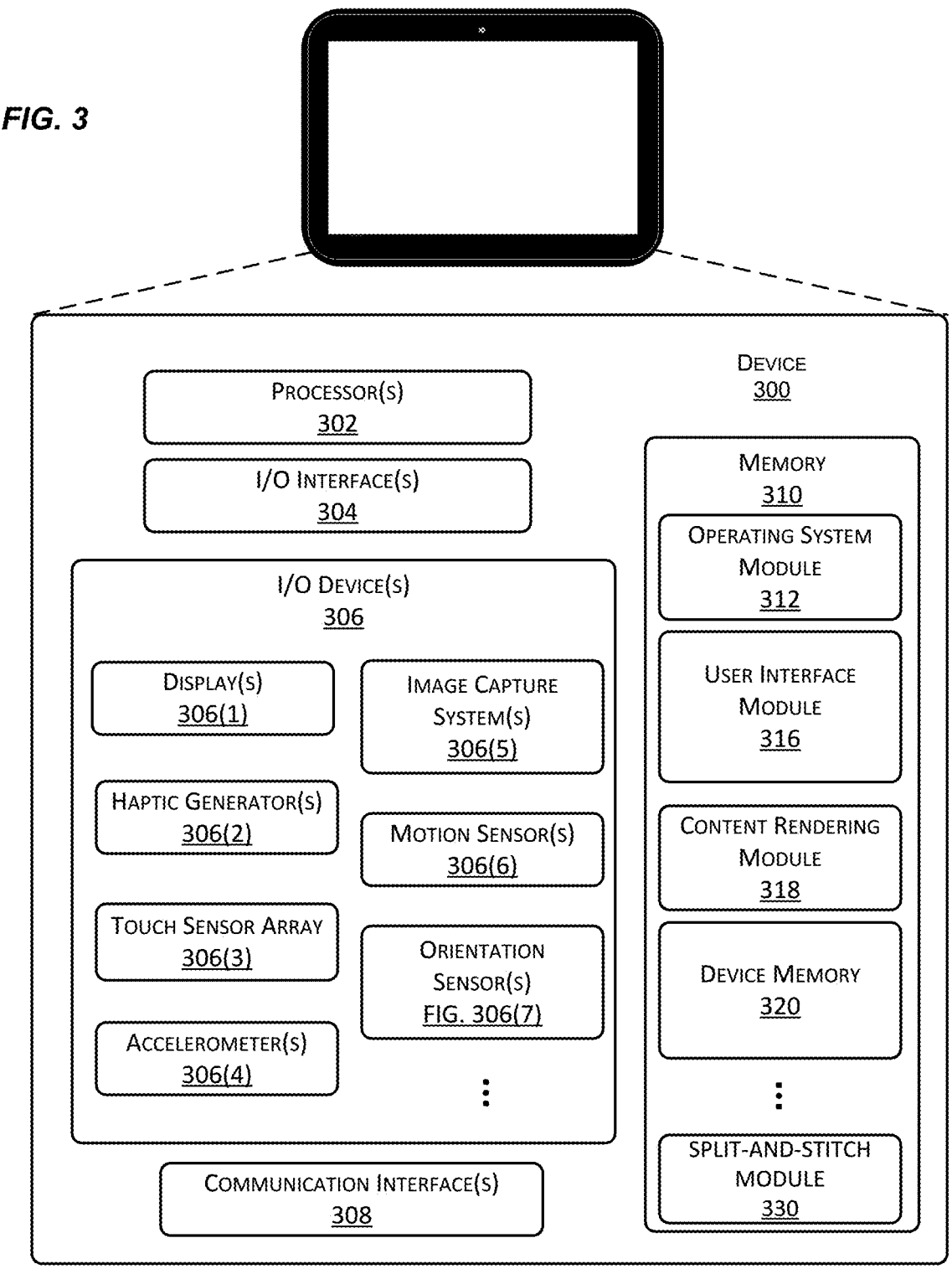
FIG. 3 is a simplified block diagram of a viewer device in which various implementations of split-and-stitch encoding of media content may be practiced.

A block diagram of an example of a viewer device 300 suitable for use with various implementations is shown in FIG. 3. Viewer device 300 may include a wide variety of device types. In FIG. 3, viewer device 300 is depicted as a tablet device and includes one or more single or multi-core processors 302 configured to execute stored instructions (e.g., in device memory 320). Viewer device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with viewer device 300.

Viewer device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Viewer device 300 also includes one or more buses or other internal communications hardware or software (not shown) that allow for the transfer of data and instructions between the various modules and components of the device.

Viewer device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of viewer device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

It will be understood that viewer device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

In certain implementations, viewer device 300 receives the final split-and-stitch encoded media content, such as requested fragments for encoded representation 110 for media content 105, and viewer device 300 is agnostic to whether or not the media content has been encoded using the disclosed split-and-stitch media content encoding techniques. In various implementations, a portion of the processes associated with splitting logic 209 in FIG. 2 may be implemented in split-and-stitch module 330 in viewer device 300. For example, viewer device 300 can locally store media content 105 as one data file that is to be encoded by split-and-stitch media content encoding system 100. Split-and-stitch module 330 can communicate with the one or more servers 203 implementing service 202 to determine if split-and-stitch encoding services are available. If available, split-and-stitch module 330 at viewer device 300 can implement processes similar to those provided by splitting logic 209 to partition at viewer device 300 the data file representing media content 105 into multiple files, each file representing a portion of media content 105 that has one or more overlapping image frames with another portion represented by another file. Each file can then be transmitted to the one or more servers 203 implementing service 202 for split-and-stitch media content encoding. In a class of implementations, as the initial files are encoded and stitched, service 202 can provide to viewer device 300 a manifest file for requesting the encoded media content for playback, even as later files for later portions of the media content 105 are being uploaded to service 202. In particular implementations, the locally stored media content 105 is already encoded, and viewer device 300 can request service 202 to transcode the media content 105.

In some implementations, split-and-stitch module 330 can also indicate to the one or more servers 203 implementing service 202 particular encoding parameters to use (e.g., a profile and level for H.264, decoder buffer characteristics, etc.), or credentials for permission to use the capabilities of split-and-stitch media content encoding system 100.

In a class of implementations, the viewer device 300 can include computing resources for performing media content encoding of particular portions of media content 105. Such encoded portions of media content 105 can be transmitted from the viewer device 300 to the one or more servers 203 implementing service 202 for stitching by muxing logic 210.

In particular implementations, processes associated with muxing logic 210 are performed by split-and-stitch module 330 at viewer device 300. For example, viewer device 300 can upload multiple files for encoding to service 202, and receive encoded versions of the multiple files from service 202. Split-and-stitch module 330 at viewer device 300 can then perform the stitching of the encoded versions of the multiple files.

It should be appreciated that the disclosed techniques for split-and-stitch media content encoding can be distributed across the splitting logic 209 and muxing logic 210 at service 202 and the split-and-stitch module 330 at viewer device 300 to varying degrees (e.g., variable apportioning of splitting logic, muxing logic, etc. between the server and client side).

Figure 4:
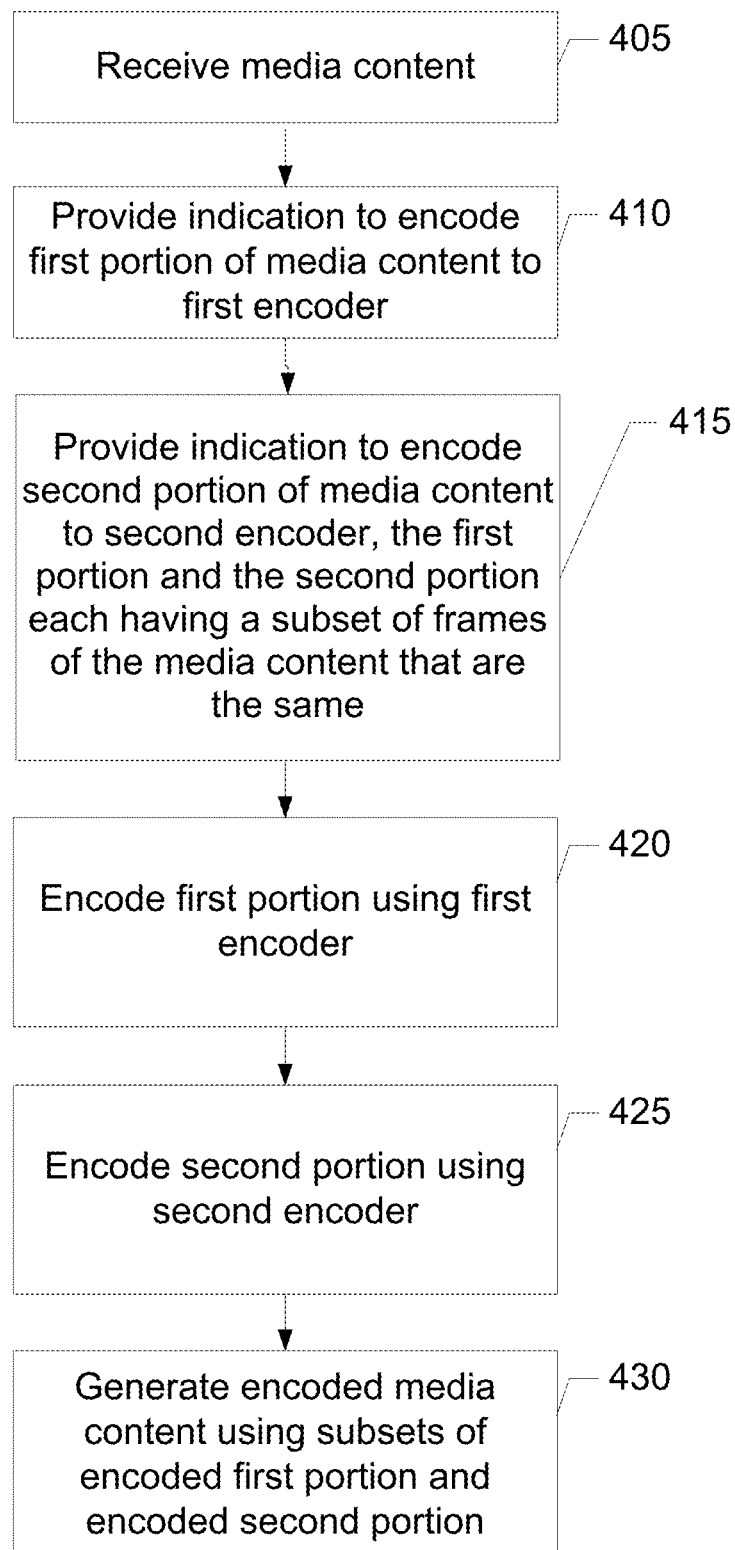
FIG. 4 is a flowchart illustrating a process for split-and-stitch encoding of media content.

FIG. 4 is a flowchart illustrating a split-and-stitch media content encoding process. In certain implementations, the split-and-stitch media content encoding process does not require bi-directional communication between encoder processes.

At step 405, media content is received. In various implementations, the media content is unencoded or uncompressed. In some implementations, the media content is already encoded, and the media content encoding system performs a split-and-stitch trans-coding. It should be noted that the techniques described herein are agnostic to specific audio or video codec implementations, and may be employed for any of a wide variety of audio and video compression standards. The media content can be of a wide variety of types, including live streaming media content such as channels or feeds with ongoing live events (e.g., real-time or near real-time sporting events, news, concerts, etc.), scheduled broadcasts of pre-recorded content, on-demand content, and so forth.

At step 410, a first indication to encode a first portion of the media content is provided to a first encoder. At step 415, a second indication to encode a second portion of the media content is provided to a second encoder. The first and second encoders can be implemented on different threads, cores, processors, or computation units within a computing device or different multiple computing devices. The first and second encoders can be the same type (e.g., same type of application specific integrated circuit (ASIC) for hardware media content encoding), or be different types (e.g., first encoder is a hardware ASIC encoder, second encoder is implemented in software in a general purpose processor). In particular implementations, the first and second encoders can be configured to the same set of encoding parameters, such as the same resolution, quality level, CBR or VBR mode, one pass or two pass setting, look ahead range setting, frame rate, bit rate constraints, quantization parameter constraints, rate control characteristics, etc. In various implementations, the first encoder and the second encoder can be configured to different sets of encoding parameters, such as, for example, due to differences in the characteristics of the first encoder and second encoder (e.g., ASIC versus software, different model numbers or revisions of a software or ASIC encoder, etc.), or based on the availability of state information for an encoded portion of the media content. As used herein, state information can include a variety of indications of the state of an encoder (or encoder output), such as VBV, HRD (or other buffer usage characteristics), IDR placement, visual quality, temporal coherence, etc.

In some implementations, an encoder can begin encoding processes for a particular portion of the media content as the particular portion is being provided to the encoder (e.g., encoder processes can be kicked off while the source is still being uploaded or created, such as, for example, for live video). The second encoder can begin encoding processes for the second portion when sufficient source material becomes available, even prior to completion of encoding of the first portion of the media content by the first encoder.

In particular implementations, the media content encoding process does not transmit information directly or indirectly between the first encoder and the second encoder, and/or does not re-encode one or more encoded frames output by the first encoder or the second encoder.

The indication for a particular portion can be a range of frames of the media content, a temporal range of the media content, a file identifier, a byte range, a file size, a scene, a chapter, a bookmarked interval, or any of wide variety of delimiters for the media content. The first and second portion can be the same number of frames, time duration, byte size, etc., or can be different. In some implementations, individual files are generated and provided to the first encoder and second encoder, such as, for example, by splitting logic 209. In various implementations, splitting logic 209 provides the first and second indication to the first and second encoders, respectively, and the first encoder and second encoder extract a specific range of bits from within one file representing the media content.

It should be appreciated that while certain implementations of the disclosed techniques are described using the context of frames, the split-and-stitch media content encoding techniques enabled by the present disclosure are compatible with splitting and stitching media content at boundaries other than between frames. For example, media content can be split and stitched at the granularity of, such as, for example, coding units, such as slices/tiles, macro blocks, and so forth.

At step 420, an encoded first portion generated by the first encoder using the first portion is received. At step 425, an encoded second portion generated by the second encoder using the second portion is received. In certain implementations, the encoded portions are received by muxing logic 210. In certain implementations, the encoded first portion has a first subset of encoded frames and a second subset of encoded frames, and the encoded second portion has a third subset of encoded frames and a fourth subset of encoded frames. The second subset and the third subset represent the same frames of the media content (e.g., are separate encodings of the same set of bits in a bitstream representing the media content), and the first subset and the fourth subset represent different frames of the media content.

For example, the encoded first portion includes frames 1-1100 and the encoded second portion includes frames 900-2000, therefore there is an overlap for frames 900-1100, and the first subset of encoded frames can refer to frames 1-899 and the second subset of encoded frames can refer to frames 900-1100 (all frames in the overlap) of the encoded first portion, and the third subset of encoded frames can refer to frames 900-1100 (all frames in the overlap) of the encoded second portion, and the fourth subset of encoded frames can refer to frames 1101-2000 of the encoded second portion. It should be appreciated that as used herein, the second subset of encoded frames or the third subset of encoded frames can also refer to less than all frames in the overlap (e.g., second subset refers to frames 900-1000, third subset refers to frames 1001-1100). It should similarly be appreciated that the first subset of encoded frames or the fourth subset of encoded frames can refer to less than all frames in the respective portion that are not in the overlap (e.g., first subset refers to frames 1-500, fourth subset refers to frames 1500-2000).

As referred to herein, a portion can include less than one GOP, segment, or fragment, a portion can include exactly one GOP, segment, or fragment, or a segment can include more than one GOP, segment, or fragment, and furthermore, reference to GOP includes closed or open GOPs, and fixed size or variable size GOPs.

It should be appreciated that as used herein, reference to a range of frame numbers is in the context of the overall media content being encoded using split-and-stitch techniques, rather than in the context of a particular portion of the media content being encoded by an encoder (e.g., the second portion in the above example includes 1100 frames, and the range from the first frame to the last frame in the second portion are referred to herein as frames 900-2000, rather than frames 1-1100).

It should be appreciated that the encoded first portion and encoded second portion include an overlapping portion. Specifically, the second subset within the encoded first portion and the third subset within the encoded second portion each correspond to one of multiple encodings of the same frames 900-1100. It should further be appreciated that these multiple encodings of the same frames are by encoders configured to the same encoding parameters, in contrast to, for example, one encoding being at 1080P resolution and another encoding being at 720P resolution. It should also be appreciated that these multiple encodings of the same frames are distinguishable from a first pass encoding and a second pass encoding of the same portion, because the encoded first portion and encoded second portion as described herein include different frames (i.e., encoded first portion does not include frames 1101-2000, encoded second portion does not include frames 1-899).

The amount of overlap (e.g., the number of frames, the temporal duration, etc.) between two adjacent portions of the media content can be constant (e.g., frames 900-1100 overlap between the first and second portion, frames 1900-2100 overlap between the second and third portion, frames 2900-3100 overlap between the third and fourth portion, etc.), or the amount of overlap can be variable (e.g., frames 900-1000 overlap between the first and second portion, frames 1800-2100 overlap between the second and third portion, frames 2900-2990 overlap between the third and fourth portion, etc.). In particular implementations, a portion assigned to a particular encoder can include non-contiguous frames (e.g., skip certain frames, such as advertisements, blank frames, etc.).

In certain implementations, one or more criteria can be used to determine the amount of overlap between portions. For example, a buffer condition at the beginning of a subsequent portion can be a factor in determining the number of overlapping frames with the end of an adjacent preceding portion. For instance, splitting logic 209 can determine a first buffer condition associated with a beginning sub-portion of the encoded subsequent portion. Such an instance may arise if, for example, encoding of the subsequent portion begins before encoding of the preceding portion is complete, and the end frame of the preceding portion is not yet defined, finalized, or can be updated (e.g., encoder A begins encoding from frame 1 at time t, encoder B begins encoding from frame 900 also at time t, and state information for frame 900-1100 from encoder B is used by splitting logic 209 to update encoder A instructions with which frame to terminate encoding at, such as at frame 1100).

As an example, if buffer usage at the beginning sub-portion of the encoded subsequent portion is high, splitting logic 209 can assign a range of frames for the preceding portion such that there is a large amount of overlap with the beginning of the subsequent portion, thereby increasing the probability that the overlapping portion between the encoded preceding portion and the encoded subsequent portion includes a transition point where buffer threshold constraints, such as, for example, VBV compliance, etc., are met. In contrast, if buffer usage at the beginning sub-portion of the encoded subsequent portion is low, splitting logic 209 can assign a range of frames for the preceding portion such that there are fewer frames that overlap. Other characteristics (e.g., IDR placement, GOP alignment, visual quality, temporal coherence, etc.) can also be accounted for, such as, for example, by splitting logic 209, when dynamically controlling the size of overlaps (e.g., controlling the size of the overlap to ensure changes in visual quality converge to within a threshold difference). It should be appreciated that in some scenarios, the determined amount of overlap can be zero frames (i.e., no overlap needed for VBV compliance, GOP alignment, smooth transition for visual quality or temporal coherence, etc.).

In a class of implementation, the final frame number of the preceding portion assigned to the first encoder is adjusted relative to if no overlap occurred (e.g., for a default portion size of 1000 frames, the final frame of the preceding portion is adjusted from 1000 to 1200), and the initial frame number of the subsequent portion assigned to the second encoder is not adjusted relative to if no overlap occurred (e.g., unchanged from initial frame number of 1001). Such a scenario can be referred to herein as the preceding portion having "end lapping," and the subsequent portion lacking "beginning lapping," notwithstanding the presence of multiple encodings of frames 1001-1200, one in the encoded preceding portion and one in the encoded subsequent portion.

It should be appreciated that the disclosed techniques are compatible with a portion having both end lapping and beginning lapping, a portion with only end lapping (e.g., which can allow state information from a subsequent portion to be used, etc.), and a portion with only beginning lapping (e.g., which can allow encoding of the portion to begin earlier, such as when frame 800 is available but frame 900 is not available for encoding, which can reduce latency for live encoding).

In a range of implementations, not all encoded frames in an overlapping portion are provided to multiplexing logic. For example, a portion can have beginning lapping in order to "warm up" state information such as VBV state, and then discard some or all frames in the beginning lapping prior to multiplexing. Specifically, a first encoder encodes a first portion with frames 1-1000, and a second encoder encodes a second portion with frames 800-2000, with the second encoder dropping the encoding of frames 800-1000 prior to stitching. Because the second encoder has 200 frames of "look behind," (e.g., the second encoder can estimate state information that accounts for the 200 frames prior to frame 1001, which is the stitch point in this example by virtue of being the first frame that is not included in the first portion), the probability that stitching together the first portion (e.g., frames 1-1000) and the truncated second portion (e.g., frames 1001-2000, with frames 800-1000 being previously discarded) violates VBV constraints (or other criteria) is reduced. The probability is reduced because since the second encoder itself encoded frames 800-1000, the buffer usage characteristics of these frames, if high, the second encoder correspondingly reduces the buffer allocation for frames 1001-2000 (and if buffer usage characteristics of frames 800-1000 are low, the second encoder sets the buffer allocation for frames 1001-2000 accordingly). It should be appreciated that not all frames need to be dropped (e.g., frames 800-900 dropped, multiplex logic chooses between the multiple encodings of frames 900-1000).

It should be appreciated that splitting logic 209 can also evaluate the buffer usage at the end of a completely encoded portion to assign, for example, the initial frame for the subsequent portion to control the amount of overlap. It should further be appreciated that such sharing of state information at the boundary of two adjacent portions of media content between different encoder processes is unidirectional. For example, state information for the beginning of a subsequent portion encoded by a first encoder can be used by splitting logic 209 to control the range of frames for the preceding portion for the second encoder to encode, but state information from the second encoder is not used to control the range of frames in the subsequent portion being encoded by the first encoder. Similarly, using state information for the end of a preceding portion to control the amount of overlap with a subsequent portion also involves unidirectional communication in relation to the boundary between the subsequent portion and the preceding portion. It should further be appreciated that the described techniques for unidirectional sharing of state information can also be between portions that are non-adjacent (e.g., the effects of state information for a first portion on a second portion can be scaled in relation to the amount of separation, such as time or number of frames, between the first portion and the second portion).

It should be appreciated that state information for other encoders can be estimated by a particular encoder using sources of information other than other encoders (i.e., without relying on unidirectional communication received from another encoder). For example, the media content itself may have embedded metadata or associated metadata (e.g., indications of IDR placement such as chapter points or advertisement insertion points, scene complexity estimators, etc.) that allow a particular encoder to estimate state information for one or more other encoders (e.g., encoder A can know that encoder B will start with an IDR at frame 1001 based on an indication of a chapter point at frame 1001). It should further be appreciated that state information can be generated by an encoder, for use by the encoder itself or for sharing with one or more other encoders, during a first pass encoding in a multi-pass (e.g., 2-pass encoding, etc.) encoding process. In certain implementations, state information can be used to dynamically vary encoding parameters. For example, based on state information (e.g., metadata indicating variations in complexity, motion, image content such as synthetic or natural imagery, etc.), a first set of encoding parameters can be used by a first encoder to encode a first section of the media content, and a second set of encoding parameters that are different than the first set of encoding parameters can be used by a second encoder to encode a second section that is subsequent to the first section. In a range of implementations, the dynamic variation in encoding parameters can also occur within the particular section of the media content that is assigned to a particular encoder by splitting logic 209. For instance, the second encoder encoding the subsequent section of the media content can be configured to a first set of encoding parameters for the overlapping portion of the subsequent section based on metadata from a first encoder encoding a preceding section that provides state information indicating that the overlapping portion of the subsequent section (i.e., the portion of the preceding section and subsequent section that overlaps) includes image frames with high complexity imagery. The second encoder can then use a second set of encoding parameters for the remaining portion of the subsequent section.

It should be noted that as an alternative or in addition to controlling the range of frames for the overlap between a subsequent and preceding portion, the unidirectional sharing of state information can also be used for configuring encoder settings (e.g., rate control settings, etc.), which as used herein is to be distinguished from the specifying of the range of frames to encode. For example, state information for the beginning of a subsequent portion encoded by a first encoder can be used by splitting logic 209 to control a second encoder encoding a preceding section, such that, for example, the buffer usage at the end of the preceding portion converges towards the buffer usage at the beginning of the subsequent portion (e.g., adjusting quantization parameter constraints to affect buffer usage, adjusting rate control parameters, etc.). For example, based on the buffer usage of 50% at around frame 900-1100 of the encoded second portion, the buffer usage for encoding the first portion is set to 50% at frame 800. It should be appreciated that convergence of other characteristics (e.g., IDR placement, GOP alignment, visual quality, temporal coherence, etc.) can also be used for adjusting encoder configurations.

In various implementations, target buffer usage can be indicated as a maximum (or minimum) buffer usage. The target buffer usage can be specified at one or more frames, such as in the overlapped portion, or in the non-overlapped portion (e.g., following the earlier example, the first subset of encoded frames, or the fourth subset of encoded frames). For example, the maximum buffer usage can increase in relation to an increasing number of frames between an end of the first portion (or a beginning of the second portion). For instance, based on the buffer usage of 50% at around frame 900-1100 of the encoded second portion, the maximum buffer usage for encoding the first portion is set to 90% at frame 400, 75% at frame 600, and 50% at frame 800. Again, it should be appreciated that regulation of other characteristics (e.g., IDR placement, GOP alignment, visual quality, temporal coherence, etc.) at different frames in a portion of the media content can also be used for adjusting encoder configurations.

At step 430, using the encoded first portion received from the first encoder and the encoded second portion received from the second encoder, an encoded representation of the media content is generated.

In certain scenarios, the encoded representation includes the first subset of encoded frames, the second subset of encoded frames, and the fourth subset of encoded frames, and excludes the third subset of encoded frames (e.g., for the overlapped portion, use the output of the first encoder). In other scenarios, the encoded representation includes the first subset of encoded frames, the third subset of encoded frames, and the fourth subset of encoded frames, and excludes the second subset of encoded frames (e.g., for the overlapped portion, use the output of the second encoder).

In yet another scenario, the encoded representation includes the first subset of encoded frames, the fourth subset of encoded frames, and certain frames from the third subset of encoded frames and certain frames from the fourth subset of encoded frames. For example, in the overlapped portion of frames 900 to 1100, VBV compliance and preferred IDR placement are met when stitching at frame 950 (e.g., stitch encoded frames 1-950 from the first encoder with at least encoded frames 951-2000 from the second encoder), and also at frame 1050 (e.g., stitch encoded frames 1-1050 from the first encoder with at least encoded frames 1051-2000 from the second encoder). The visual quality from encoded frame 945 from the first encoder through encoded frame 955 from the second encoder are more similar than the visual quality from encoded frame 1045 from the first encoder through encoded frame 1055 from the second encoder, therefore the stitching at frame 950 is preferred over stitching at frame 1050, even though both would comply with other criteria such as VBV compliance or preferred IDR placement. In certain scenarios where the encoded representation for the overlapped portion includes certain frames from the third subset of encoded frames and certain frames from the fourth subset of encoded frames, the frames from the third subset (or the fourth subset) can be non-contiguous (e.g., frames from third subset, followed by frames from fourth subset, followed by frames from third subset, etc.).

It should be appreciated that for a set of stitching criteria, an overlapped region can include multiple stitching points that comply with one or more of the criteria, and a ranking of criteria can be used to determine which one of the multiple points are selected by muxing logic 210 (e.g., ranking visual quality higher than temporal coherency results in maximizing consistency in visual quality over consistency in temporal coherency when multiple stitch points are available, etc.).

In various implementations, stitching of frames from the encoded first portion and encoded second portion can occur at the muxing layer, which is where VBV compliance can be determined and enforced.

In certain implementations, selecting between the second subset of the encoded first portion or the third subset of the encoded second portion can be based in part on comparing one or more buffering requirements. For example, the buffering requirements can be based on complying with VBV, HRD, or other buffer constraints.

In various implementations, selecting between the second subset of the encoded first portion or the third subset of the encoded second portion can be based in part on determining the position of instantaneous decoder refresh frames. For example, a minimum number of frames between successive IDR frames or a maximum number of frames between successive IDR frames can be used as one or more constraints.

In particular implementations, selecting between the second subset of the encoded first portion or the third subset of the encoded second portion can be based in part on comparing a similarity between a perceptual video quality of one or more encoded frames in different subsets of the encoded first portion and encoded second portion. For example, the perceptual video quality between the first subset and second subset can have high similarity, whereas the perceptual video quality between the first subset and the third subset can have low similarity, and therefore the second subset can be preferred over the third subset to maintain greater consistency in perceptual video quality.

In a range of implementations, selecting between the second subset of the encoded first portion or the third subset of the encoded second portion can be based in part on comparing a temporal coherence characteristic of one or more encoded frames in different subsets of the encoded first portion and encoded second portion. For example, the first subset and second subset can have high temporal coherence, whereas the temporal coherence between the first subset and the third subset can be lower, and therefore the second subset can be preferred over the third subset to maintain greater consistency in temporal coherence.

It should be appreciated that in a range of implementations, one or more criteria including but not limited to the examples above (e.g., VBV compliance, IDR placement, visual quality consistency, temporal coherence and consistency, etc.) are monitored by an encoder for a particular portion being encoded by the encoder. For instance, buffer usage is maintained below a threshold by the first encoder within the entirety of an encoded image frames corresponding to media content playback timeline 00:00:00 to 00:00:14, and by the second encoder within the entirety of an encoded image frames corresponding to media content playback timeline 00:00:12 to 00:00:26, with each encoded portion corresponding to 14 seconds of playback time, and a two second overlap corresponding to media content playback timeline 00:00:12 to 00:00:14. It should further be appreciated that in a range of implementations, for a 10 second interval of playback time corresponding to media content playback timeline 00:00:08 to 00:00:18, part of the frames for playback in the decoder buffer will be associated with the first encoder, and part of the frames for playback in the decoder buffer will be associated with the second encoder, and neither the first encoder nor the second encoder can verify compliance at the decoder with the one or more criteria for this 10 second interval because it includes frames that were not output by each respective encoder, and therefore each respective encoder lacks information on such frames. However, because there are multiple encodings of the media content corresponding to media content playback timeline 00:00:12 to 00:00:14, a particular version in the multiple encodings that minimizes the risk of violating or guarantees compliance with certain criteria (e.g., selecting the version associated with state information indicating lower buffer usage, etc.) is selected, such as, for example, by multiplexing logic 210 at step 430.

In certain implementations, multiplexing logic 210 can multiplex between n versions of encoded frames for a particular overlapped portion, where n is any positive integer. For example, stitching logic 209 can indicate to a first encoder to encode frames 1-600, indicate to a second encoder to encode frames 200-800, and indicate to a third encoder to encode frames 400-1000. As a result, there are three versions of the overlapped portion (e.g., frames 400-600), and the techniques enabled by the present disclosure for selecting between two versions for the overlapped portion can be extended to selecting between n versions.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:

providing to a first encoder a first indication to encode a first plurality of image frames of media content;

providing to the first encoder a first set of encoding parameters;

providing to a second encoder a second indication to encode a second plurality of image frames of the media content, the first plurality of image frames and the second plurality of image frames having at least one overlapping image frame in a playback timeline of the media content;

providing to the second encoder the first set of encoding parameters;

receiving an encoded first plurality of image frames generated by the first encoder using the first plurality of image frames, the encoded first plurality of image frames having a first subset of encoded image frames and a second subset of encoded image frames;

receiving an encoded second plurality of image frames generated by the second encoder using the second plurality of image frames, the encoded second plurality of image frames having a third subset of encoded image frames and a fourth subset of encoded image frames, wherein the second subset and the third subset represent encodings of identical bits in a bitstream representing the media content, the identical bits representing the at least one overlapping image frame in the playback timeline of the media content, and the first subset and the fourth subset represent encodings of different bits in the bitstream representing the media content;

selecting the third subset of the encoded second plurality of image frames based, at least in part, on determining that the third subset includes an instantaneous decoder refresh frame and that the second subset does not include an instantaneous decoder refresh frame, wherein the instantaneous decoder refresh frame indicates that frames subsequent to the instantaneous decoder refresh frame do not reference frames prior to the instantaneous decoder refresh frame; and generating using the encoded first plurality of image frames received from the first encoder and the encoded second plurality of image frames received from the second encoder, an encoded representation of the media content having the first subset of encoded image frames, the third subset of encoded image frames, and the fourth subset of encoded image frames, and excluding the second subset of encoded image frames.

2. The method of claim 1, wherein the media content encoding process does not transmit information directly or indirectly between the first encoder and the second encoder.

3. The method of claim 1, further comprising:
configuring the first encoder and the second encoder such that maximum buffer usage increases in relation to an increasing number of image frames between an end of the first plurality of image frames and a beginning of the second plurality of image frames.

4. The method of claim 1, further comprising:
selecting the third subset of the encoded second plurality of image frames based in part on comparing one or more buffering requirements of the second subset of the encoded first plurality of image frames and the third subset of the encoded second plurality of image frames.

5. A computer-implemented method, comprising:
providing to a first encoder a first indication to encode a first portion of media content;
providing to a second encoder a second indication to encode a second portion of the media content;
receiving an encoded first portion generated by the first encoder using the first portion, the encoded first portion having a first subset of encoded frames and a second subset of encoded frames;
receiving an encoded second portion generated by the second encoder using the second portion, the encoded second portion having a third subset of encoded frames and a fourth subset of encoded frames, wherein the second subset and the third subset represent a same range of frames of the media content, and the first subset and the fourth subset represent different ranges of frames of the media content;
selecting the third subset of the encoded second portion based, at least in part, on determining that the third subset includes an instantaneous decoder refresh frame and that the second subset does not include an instantaneous decoder refresh frame, wherein the instantaneous decoder refresh frame indicates that frames subsequent to the instantaneous decoder refresh frame do not reference frames prior to the instantaneous decoder refresh frame; and
generating using the encoded first portion received from the first encoder and the encoded second portion received from the second encoder, an encoded representation of the media content having the first subset of encoded frames, the third subset of encoded frames, and the fourth subset of encoded frames, and excluding the second subset of encoded frames.

6. The method of claim 5, further comprising:
selecting the third subset of the encoded second portion based in part on comparing one or more buffering requirements of the second subset of the encoded first portion and the third subset of the encoded second portion.

7. The method of claim 5, further comprising:
selecting the third subset of the encoded second portion based in part on comparing: a first similarity between a perceptual video quality of one or more encoded frames of the second subset and a perceptual video quality of one or more encoded frames of the first subset or fourth subset, and a second similarity between a perceptual video quality of one or more encoded frames of the third subset and the perceptual video quality of one or more encoded frames of the first subset or fourth subset.

8. The method of claim 5, further comprising:
selecting the third subset of the encoded second portion based in part on comparing: a first similarity between a temporal coherence of one or more encoded frames of the second subset and a temporal coherence of one or more encoded frames of the first subset or fourth subset, and a second similarity between a temporal coherence of one or more encoded frames of the third subset and the temporal coherence of one or more encoded frames of the first subset or fourth subset.

9. The method of claim 5, wherein:
the media content encoding process does not transmit information directly or indirectly between the first encoder and the second encoder, or does not re-encode one or more frames of the second subset or the third subset.

10. The method of claim 5, further comprising:
configuring the first encoder and the second encoder such that maximum buffer usage increases in relation to an increasing number of frames between an end of the first portion and a beginning of the second portion.

11. The method of claim 5, further comprising:
determining a first buffer condition associated with a beginning sub-portion of the encoded second portion; and
configuring encoding parameters of the first encoder such that a second buffer condition associated with an ending sub-portion of the encoded first portion is within a threshold relative to the first buffer condition.

12. The method of claim 5, further comprising:
determining a first buffer condition associated with a beginning sub-portion of the encoded second portion; and
configuring a number of frames for the second subset of encoded frames such that a second buffer condition associated with an ending sub-portion of the encoded first portion is within a threshold relative to the first buffer condition.

13. A system comprising one or more processors and one or more non-transitory storage media operatively coupled to the one or more processors, the one or more processors being configured for:
providing to a first encoder a first indication to encode a first portion of media content;
providing to a second encoder a second indication to encode a second portion of the media content;
receiving an encoded first portion generated by the first encoder using the first portion, the encoded first portion having a first subset of encoded frames and a second subset of encoded frames;
receiving an encoded second portion generated by the second encoder using the second portion, the encoded second portion having a third subset of encoded frames and a fourth subset of encoded frames, wherein the second subset and the third subset represent a same range of frames of the media content, and the first subset and the fourth subset represent different ranges of frames of the media content;
selecting the third subset of the encoded second portion based, at least in part, on determining that the third subset includes an instantaneous decoder refresh frame and that the second subset does not include an instantaneous decoder refresh frame, wherein the instantaneous decoder refresh frame indicates that frames subsequent to the instantaneous decoder refresh frame do not reference frames prior to the instantaneous decoder refresh frame; and generating using the encoded first portion received from the first encoder and the encoded second portion received from the second encoder, an encoded representation of the media content having the first subset of encoded frames, the third subset of encoded frames, and the fourth subset of encoded frames, and excluding the second subset of encoded frames.

14. The system of claim 13, wherein the one or more processors are further configured for:

selecting the third subset of the encoded second portion based in part on comparing one or more buffering requirements of the second subset of the encoded first portion and the third subset of the encoded second portion.

15. The system of claim 13, wherein the one or more processors are further configured for:

selecting the third subset of the encoded second portion based in part on comparing: a first similarity between a perceptual video quality of one or more encoded frames of the second subset and a perceptual video quality of one or more encoded frames of the first subset or fourth subset, and a second similarity between a perceptual video quality of one or more encoded frames of the third subset and the perceptual video quality of one or more encoded frames of the first subset or fourth subset.

16. The system of claim 13, wherein the one or more processors are further configured for:

selecting the third subset of the encoded second portion based in part on comparing: a first similarity between a temporal coherence of one or more encoded frames of the second subset and a temporal coherence of one or more encoded frames of the first subset or fourth subset, and a second similarity between a temporal coherence of one or more encoded frames of the third subset and the temporal coherence of one or more encoded frames of the first subset or fourth subset.

17. The system of claim 13, wherein:

the media content encoding process does not transmit information directly or indirectly between the first encoder and the second encoder, or does not re-encode one or more frames of the second subset or the third subset.

18. The system of claim 13, wherein the one or more processors are further configured for:

configuring the first encoder and the second encoder such that maximum buffer usage increases in relation to an increasing number of frames between an end of the first portion and a beginning of the second portion.

19. The system of claim 13, wherein the one or more processors are further configured for:

determining a first buffer condition associated with a beginning sub-portion of the encoded second portion; and configuring encoding parameters of the first encoder such that a second buffer condition associated with an ending sub-portion of the encoded first portion is within a threshold relative to the first buffer condition.

20. The system of claim 13, wherein the one or more processors are further configured for:

determining a first buffer condition associated with a beginning sub-portion of the encoded second portion; and configuring a number of frames for the second subset of encoded frames such that a second buffer condition associated with an ending sub-portion of the encoded first portion is within a threshold relative to the first buffer condition.

* * * * *